May 15, 1934.  A. J. SINCLAIR ET AL  1,958,722
COMPOUND HYDRAULIC BRAKE MASTER CYLINDER
Filed June 19, 1930

INVENTOR
HOWARD E. MAYNARD AND
ALFRED J. SINCLAIR.
BY
ATTORNEY

Patented May 15, 1934

1,958,722

UNITED STATES PATENT OFFICE 1,958,722

COMPOUND HYDRAULIC BRAKE MASTER CYLINDER

Alfred J. Sinclair and Howard E. Maynard, Detroit, Mich., assignors to Chrysler Corporation, Detroit, Mich., a corporation of Delaware Application June 19, 1930, Serial No. 462,369

14 Claims. (Cl. 60—54.6)

This invention relates to an improved hydraulic vehicle braking system.

In vehicle braking systems of the hydraulic type it has been found desirable to provide a master cylinder which is adapted to supply a fluid pressure medium to the brake cylinders at a faster rate during initial application of the braking force than during the pressure building stage of the braking operation. In this way, the slack in the system is rapidly taken up and pressure can be created in the system thereafter with the application of a substantially light brake applying force.

In order to compensate in the system for both leakage and wear of the brake lining it is necessary to provide a reservoir which communicates with the system and augments the quantity of fluid therein. When the pistons of the master cylinder are returned to their normal positions before the brake cylinders have released and discharged the fluid which is injected thereinto during application of the brakes, the reservoir fills the system to capacity so that when the pistons of the brake cylinders ultimately are released it is necessary to allow some of the fluid medium to be returned to the reservoir.

The main objects of the invention are to provide an improved master cylinder in a hydraulic braking system; to provide a device of this kind which discharges a fluid medium at a greater rate during initial stages of its operation than during subsequent stages so as to rapidly take up slack in the braking system and to thereafter build up a substantial pressure in the system with a comparatively light brake applying force; to provide a compound master cylinder having a pair of cylinders of different diameters; to provide separate pistons in each cylinder one being operable mechanically by the other for varying the mechanical advantages of the system; to provide an improved gasket on the smaller piston having peripheral grooves through which the fluid that is displaced by the larger piston may flow while the pressure in the system is below a predetermined degree; and to provide a gasket of this kind which is adapted to be expanded against the walls of the cylinder in which it is located by the pressure in the system so as to thereafter cause the smaller piston to be the dominant pressure building factor.

Further objects of this invention are to provide a reservoir which communicates with the system for supplying fluid medium thereto so as to compensate for leakage and wear of the braking parts; to provide a port in the reservoir which communicates with the larger cylinder of the master cylinder for permitting fluid which is introduced into the system during sticking of the pistons of the braking cylinders to return to the reservoir when the brake cylinder pistons are ultimately released; to provide a passage in the smaller piston for allowing reverse flow of fluid from the system to the large cylinder and ultimately to the reservoir; and to provide means on the large piston for sealing the latter passage as the smaller piston is operated by the large piston.

An illustrative embodiment of my invention is shown in the accompanying drawing, in which.

Figure 1:
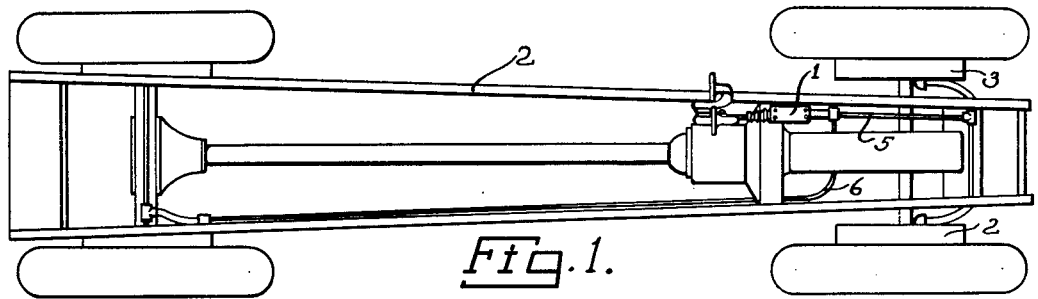
Fig. 1 is a top plan view of a vehicle chassis embodying my improved vehicle braking system.

In the form shown, my improved compound master cylinder 1 is illustrated in connection with a hydraulic braking system of a vehicle 2 and includes vehicle wheel brakes 3 having brake cylinders, not shown, by which the expansible members of the brake mechanism are actuated. The outlet 4 of the master cylinder 1 communicates with the brake cylinders of the front and rear wheels of the vehicle through tubes 5 and 6 respectively.

Formed in the master cylinder is a pair of axially aligned cylindrical bores 7 and 8 in which pistons 9 and 10 are slidably mounted. The bore 8 is located at the discharge end of the master cylinder and is smaller in diameter than the bore 7 which is located at the other end of the master cylinder. Provided between the bores 7 and 8 is a restriction 11 having a central aperture 12 through which a stem 13 integrally formed on the piston 10 is slidably mounted. The restriction 11 has a plurality of passages 14 which communicate at their ends with the interiors of the bores 7 and 8. The large piston 9 is provided with a tubular stem portion 15 having a flange 16 which substantially fits the bore 7 of the cylinder and forms an annular chamber 17 which is bounded by the head end of the piston, flange 16, the outer periphery of the tubular stem 15 and the inner periphery of the bore 7.

Formed on the master cylinder 1 is a fluid medium reservoir 18 in which oil 19, or another suitable medium, is contained. The bottom wall 20 of the reservoir is provided with an opening 21 which registers with the chamber 17 surrounding the stem 15 of the large piston in all positions of the latter retaining this chamber filled with oil at all times. A small opening 22, called a compensating orifice, is also provided in the bottom wall 20 of the reservoir forming a communication between the interior of the reservoir and the interior of the large bore 7 of the master cylinder when the piston 9 therein is in its fully retracted position. The large bore 7 of the master cylinder has a fluid outlet 23 which is provided with a valve seat 24 on which a ball valve 25 is seated. The ball 25 is located in a tubular structure 26 formed in the reservoir 18 and it is normally held upon the seat 24 by a spring 27 that bears at its upper end upon a threaded adjustable plug 28. The force by which the ball 25 is held upon its seat may be varied by adjusting the plug 28 so as to predetermine the degree of pressure required in the large bore 7 to lift the ball 25 and allow fluid to flow from the bore 7 into the reservoir 18.

Figure 2:
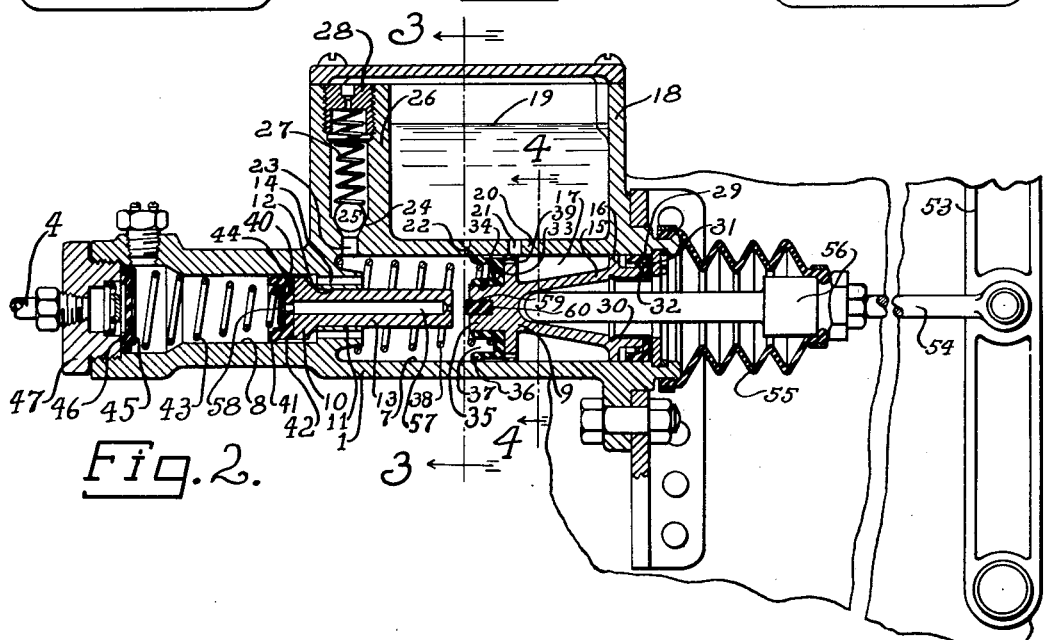
Fig. 2 is a vertical section of a master cylinder included in the braking system.
Figure 3:
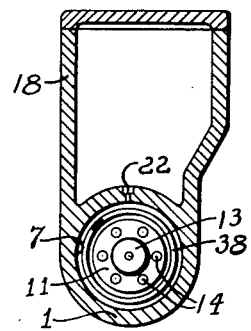
Fig. 3 is a transverse vertical section taken on line 3—3 of Fig. 2.

A washer or gasket 29 on the right end of the tubular stem 15 of the large piston 9, as viewed in Fig. 2, forms a seal between this extremity of the stem and the walls of the large bore 7. This gasket preferably comprises rubber and is held in place by a tubular member 30 which extends into the hollow stem 15 and has a flange 31 abutting the side of the gasket, the gasket being urged outwardly against the wall of the bore 7 by an expansible ring member 32. Mounted on the head end of the piston 9 is a yieldable annular member 33 preferably comprising rubber and having a central opening 34 in which a cylindrical boss 35, integral with the head end of the piston 9 is received. The yieldable member 33 has a skirt portion 36 which closely fits against the sides of the bore 7 and it is provided with an annular groove 37 in which one end of a spring 38 is seated. The other end of the spring bears against the restriction 11 so as to normally urge the large piston 9 to the right as viewed in Fig 2. The head of the large piston 9 is provided with a plurality of circumferentially spaced apertures 39 through which oil may pass from the chamber 17 around the stem 15 during rightward movement of the piston. The oil which passes through the apertures 39 escapes into the left end of the bore 7 around the skirt 36 of the yieldable member 33 as the skirt is deflected inwardly. Upon leftward movement of the large piston 9 the pressure which is created in the left end portion of the bore 7 urges the skirt 36 outwardly forming an efficient liquid tight seal between the piston and the walls of the bore.

The head end of the small piston 10 is slightly smaller in diameter than the diameter of the small bore and is also provided with a yieldable member 40, preferably comprising rubber. This yieldable member has an overhanging skirt portion 41 and is provided with peripheral grooves 42 which extend axially from the right extremity of the member 40 to the right extremity of the skirt 41. The grooves 42 provide passages through which oil may pass from the right end portion of the small bore 8 to the left side of the piston 10 during rightward movement thereof. A spring 43 bears at one end against a metal cup 44 which is located within the skirt 41 of the yieldable member 40 and at its other end against a metal cap 45 of a valve structure by which the flow of lubricant to and from the master cylinder is controlled.

Figures 4, 5:
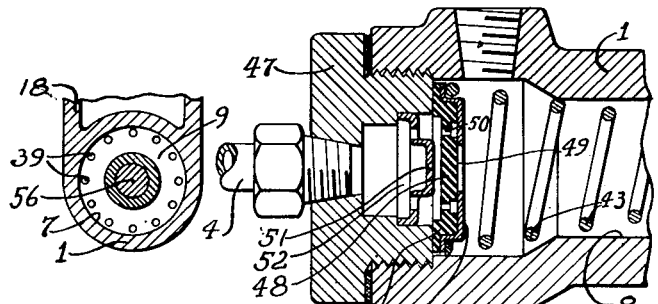
Fig. 4 is a transverse vertical section taken on line 4—4 of Fig. 2.
Fig. 5 is an enlarged section of the discharge end of the master cylinder showing the valve structure thereof in detail.

This valve structure is illustrated in detail in Fig. 5 wherein it is shown to include a yieldable diaphragm 46 which is located between the cap 45 and the inner end of a threaded plug 47. The diaphragm 46 has a thickened central portion 48 which registers with an aperture 49 formed in the cap 45 and it is provided with a plurality of circumferentially spaced apertures 50 which are located out of registration with the opening 49. When the smaller piston 10 is moved to the left, as viewed in Fig. 2, the central portion 48 is deflected leftwardly so as to uncover the apertures 50 and permit oil to flow from the small bore 8 to the outlet 4 of the master cylinder. The yieldable member 46 is held against excessive deflection under pressure of the oil by a support 51 which is located in a recess 52 formed in the inner end of the plug 47. When the small piston 10 is returned to its retracted position by the spring 43 the pressure which has been created in the brake cylinders and the tubes communicating therewith, moves the yieldable member 46 to the right against the action of the spring 43 permitting the oil to flow in a reverse direction into the small bore 8. The spring 43 closes the valve when the pressure in the system has decreased to substantially eight pounds preventing a further decrease in pressure.

The master cylinder is provided with actuating mechanism which includes a foot pedal 53 having a push rod 54 thereon which extends into the tubular stem 15 of the large piston 9. A flexible boot 55 is secured at one end to the master cylinder and at its other end to a collar 56 carried by the rod 54. This boot closes the left pistons of the brake cylinders, or parts of their end of the master cylinder protecting it against the admission of dirt and other foreign matter.

Frequently in hydraulic braking systems the associated structure, stick and fail to return to their retracted positions when the application of the braking force is discontinued. Under these conditions, both pistons 9 and 10 are moved to their normal positions by the springs 38 and 43 respectively and during rightward movement of these pistons the portions of the bores 7 and 8 to the left of the piston heads are filled with oil which seeps through the apertures 39 in the case of the large piston and through the grooves 42 in the case of the small piston, the provision of this filling action being necessary to compensate for leakage and wear of the brake bands and so as to retain the system filled with oil at all times. Thus, when the pistons of the brake cylinders are ultimately released they displace a quantity of oil which seeks to enter the already filled bores of the master cylinder. In order to accommodate the excess oil and to allow the brake cylinder pistons to return, it is necessary to permit some of the oil in the bores 7 and 8 to flow back into the reservoir 18. The compensating orifice 22 permits oil to flow from the interior of the large bore 7, back into the reservoir and the small piston 10 and its stem 13 are provided with a passage 57 which communicates with an aperture 58 in the yieldable member 40 through which lubricant from the small bore 8 may flow into the large bore 7 and from there into the reservoir. The right end of the passage 57 is closed during leftward movement of the two pistons by a rubber sealing member 59 mounted in a recess 60 formed in the boss 35 of the head of the large piston 9.

In operation, depression of the foot pedal 53 moves the push rod 54 to the left, as viewed in Fig. 2, and in turn forces the large piston 9 to the left. The large piston 9 engages the stem 13 of the small piston after it has moved through a comparatively short distance and in this manner, the two pistons are moved simultaneously. During the first stages of the compression strokes of the pistons the large piston 9 displaces a greater quantity of oil from the large bore 7, than is displaced from the small bore 8 by the small piston 10. The oil from the large bore 7 passes through the passages 14, into the small bore 8 and around the skirt 41 of the yieldable member 40. The oil escapes through the outlet valve 48 in the above manner and passes to the outlet 4 of the master cylinder. During this initial operating stage the large piston 9 is the dominant pressure building factor and it displaces oil from the master cylinder at a comparatively high rate so as to quickly take up slack in the system. Gradually the pressure on the left end of the small piston 10 is built up until it becomes sufficient to expand the skirt 41 of the yieldable member 40 against the side walls of the small bore 8 forming a seal which prevents oil from entering the left end of the small bore around the skirt. This action also causes the pressure in the large bore 7 to be increased until it is sufficient in degree to lift the valve 25 from its seat 24. After the valve 24 is open the oil which is displaced by the large piston 9 is by-passed into the reservoir 18 and further effective compression of the oil is produced solely by the small piston 10. This piston, having a comparatively small diameter is capable of building up an extremely high pressure in the braking system by the application of a moderate brake applying force.

Although but one specific embodiment of this invention has herein been shown and described, it will be understood that various changes including the size, shape and arrangement of parts may be made without departing from the spirit of our invention and it is not our intention to limit its scope other than by the terms of the appended claims.

We claim:

1. In a hydraulic vehicle braking system, a master cylinder having a pair of bores therein and a communicating outlet, one bore being smaller in diameter than the other, a pair of pistons slidably mounted in said cylinder each located in one of said bores, the piston in the smaller bore being movable by engagement with the piston in the larger bore, and a yieldable member on the piston of said smaller bore for permitting the passage of fluid displaced by the other piston to said outlet when the pressure in said system is below a predetermined degree.

2. In a hydraulic vehicle braking system, a master cylinder having a pair of bores therein and a communicating outlet, one bore being smaller in diameter than the other, a pair of pistons slidably mounted in said cylinder each located in one of said bores and disengaged one from the other when disposed at the starting ends of their respective strokes, the piston in the smaller bore being movable by engagement with the piston in the larger bore, a fluid reservoir having a port communicating with the large bore of said cylinder, and a normally closed valve in said port for preventing the flow of fluid from the larger bore during initial movement of the piston in the latter and adapted to open when a predetermined pressure is attained in the larger bore so as to discharge the fluid therefrom directly into said reservoir during the remaining movement of the piston of said larger bore.

3. In a hydraulic braking system, a compound master cylinder having a pair of communicating bores therein, a pair of pistons one in each of said bores and each corresponding in diameter with the bore in which it is located, means for moving said pistons, a valve member on the smaller of said pistons for permitting the fluid displaced by the large piston to pass through said smaller bore when the pressure of the fluid in said system is under a predetermined degree, and means for releasing the pressure in the larger bore at a predetermined pressure therein so as to permit the small piston to independently control the pressure in said system thereafter.

4. In a hydraulic braking system, a compound master cylinder having a pair of communicating bores therein, a pair of pistons, one in each of said bores and each corresponding in diameter with the bore in which it is located, means for moving said pistons, a valve member on the smaller of said pistons for permitting the fluid displaced by the large piston to pass through said smaller bore when the pressure of the fluid in said system is under a predetermined degree, means for releasing the pressure in the larger bore at a predetermined pressure therein so as to permit the small piston to independently control the pressure in said system thereafter, the small piston having a return passage, and means on the large piston for sealing said return passage during the compression stroke of said pistons.

5. In a braking system, a compound master cylinder having a pair of bores therein having different diameters, a larger piston in the larger bore of said cylinder, an outlet leading from said large bore for relieving the pressure therein, a small piston in the other bore thereof having a passage therethrough communicating with said bores, and a yieldable member on said large piston for sealing said passage.

6. A compound master cylinder for a vehicle braking system having a pair of bores of different diameters and a communicating outlet, a large piston in the bore of the larger diameter, a small piston in the other bore operable by engagement with said large piston, a constriction between said bores having a bearing for slidably supporting said small piston and having passages communicating with said bores, and a valve member on said small piston for permitting fluid from said larger bore to pass to said outlet, said member being adapted to be held in a closed position by a predetermined pressure in the smaller bore.

7. A compound master cylinder for a vehicle braking system having a pair of communicating bores of different diameters and a communicating outlet, a large piston in the bore of the larger diameter, a small piston in the other bore having a diameter substantially less than the diameter of the smaller bore, a yieldable member on said small piston closely fitting the walls of said smaller bore and having grooves in its inner periphery for admitting fluid displaced by said large piston to pass to said outlet during initial movement of said large piston, a skirt on said member expansible by the pressure of the fluid in advance of said small piston for preventing the flow of fluid past the latter during the remaining portion of the stroke of said large piston, and means for moving said pistons towards said outlet so as to displace fluid from said master cylinder, initially by said large piston alone and thereafter by said small piston alone.

8. A compound master cylinder for a vehicle braking system having a pair of communicating bores of different diameters and a communicating outlet, a large piston in the bore of the larger diameter, a small piston in the other bore having a diameter substantially less than the diameter of the smaller bore, a yieldable member on said small piston closely fitting the walls of said smaller bore and having grooves in its inner periphery, a skirt on said member expansible by the pressure of fluid in advance of said small piston for preventing fluid displaced by the large piston from passing to said outlet, and means for moving said pistons towards said outlet so as to displace fluid from said master cylinder, initially by said large piston alone and a valve for relieving the pressure in the larger bore of said cylinder so as to cause said small piston to become the dominant pressure building factor at a predetermined pressure.

9. A compound master cylinder for a vehicle braking system including a housing having a pair of axially aligned communicating bores therein and a communicating outlet, one of said bores being smaller in diameter than the other, large and small pistons in said large and small bores respectively, the small piston being operable by the larger piston, means for moving the larger piston, yieldable means on the small piston for allowing the passage of fluid displaced by the larger piston to said outlet during only a portion of the stroke of said larger piston, and means for relieving the pressure created by the large piston when the passage of fuel from the large bore to said outlet is discontinued.

10. In a vehicle braking system, a housing including a pair of communicating cylinders having an outlet and a communicating oil reservoir, one cylinder being smaller than the other, a pair of pistons, one in each cylinder, the small piston being provided with a passage for allowing oil to flow to said outlet under the pressure of said large piston when the pressure in the large cylinder exceeds the pressure in the system so as to feed oil into said system at a comparatively fast rate, means responsive to the pressure in the small bore for obstructing a reverse flow of oil through said passage when the pressure in said small bore exceeds that of the large cylinder and means for limiting the pressure in said large cylinder so as to cause the smaller piston to become the dominant pressure building factor at a predetermined pressure in said system.

11. A compound master cylinder for a vehicle braking system including a body part having a pair of bores therein and a communicating outlet, a reservoir communicating with one of said bores, a pair of pistons, one slidably mounted in each bore and having different diameters and displacement capacities, the smaller of said pistons having a passage therethrough for allowing a reverse flow of liquid from said outlet to said reservoir during movement of the smaller piston in one direction, and means on said larger piston for obstructing said reverse flow of liquid during movement of the smaller piston in an opposite direction.

12. A compound master cylinder for a vehicle braking system including a body part having a pair of cylindrical chambers therein and a communicating outlet, a pair of pistons, one slidably mounted in each chamber and having different displacement capacities, one of said pistons having a passage for permitting a reverse flow of oil through said chambers and having an extremity registering and engageable with the other piston, means acting upon the latter piston for actuating both of said pistons, and means for closing said passage during actuation of one piston by the other.

13. In a brake system, a compound master cylinder having a pair of bores therein of different diameters, respectively, a large piston in the larger of said bores, a small piston in the smaller of said bores, one of said pistons having a passage therethrough communicating with said bores, an outlet leading from the bore containing the other piston having a relief valve for releasing the pressure in the latter bore, and a member for sealing said passage carried by the piston of the bore having said outlet.

14. A compound master cylinder for a vehicle braking system including a body part having a pair of cylindrical chambers therein of different diameters and a communicating outlet, small and large pistons in the small and large chambers of body part respectively, said small piston having a passage for permitting a reverse flow of liquid through said chambers and being operable by engagement with said large piston, and means on said large piston for closing said passage during actuation of said small piston by said large piston.

HOWARD E. MAYNARD.
ALFRED J. SINCLAIR.

CERTIFICATE OF CORRECTION.

Patent No. 1,958,722.  May 15, 1934.

ALFRED J. SINCLAIR, ET AL.

It is hereby certified that error appears in the printed specification of the above numbered patent requiring correction as follows: Page 2, line 119, strike out the words "pistons of the brake cylinders, or parts of their" and insert the same after line 122; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.